(12) United States Patent
Gellert (10) Patent No.: US 7,025,585 B2
(45) Date of Patent: Apr. 11, 2006

(54) MOLD GATE INSERT WITH A THERMAL BARRIER

(76) Inventor: Jobst U. Gellert, 125 Gloucester Avenue, Oakville, ON (CA) L6J 3W3

( * ) Notice: Subject to any disclaimer, the term of this patent is extended or adjusted under 35 U.S.C. 154(b) by 172 days.

(21) Appl. No.: 10/411,399

(22) Filed: Apr. 11, 2003

(65) Prior Publication Data

US 2003/0235638 A1 Dec. 25, 2003

Related U.S. Application Data

(60) Provisional application No. 60/371,711, filed on Apr. 12, 2002.

(51) Int. Cl.
*B29C 45/20* (2006.01)
(52) U.S. Cl. .................... 425/549; 425/564
(58) Field of Classification Search ............. 425/549, 425/562, 563, 564, 565, 566
See application file for complete search history.

(56) References Cited

U.S. PATENT DOCUMENTS

| | | |
|---|---|---|
| 2,865,050 A | 12/1958 | Strauss |
| 3,488,810 A | 1/1970 | Gellert |
| 3,716,318 A | 2/1973 | Erik et al. |
| 3,741,704 A | 6/1973 | Beasley |
| 3,952,927 A | 4/1976 | Schaumburg et al. |
| 4,004,871 A | 1/1977 | Hardy |
| 4,013,393 A | 3/1977 | Gellert |
| 4,043,740 A | 8/1977 | Gellert |
| 4,306,852 A | 12/1981 | Mateev et al. |
| 4,652,230 A | 3/1987 | Osuna-Diaz |
| 4,771,164 A | 9/1988 | Gellert |
| 4,781,572 A | 11/1988 | Boring |
| 4,911,636 A | 3/1990 | Gellert |
| 4,945,630 A | 8/1990 | Gellert |
| 5,049,062 A * | 9/1991 | Gellert .................... 425/549 |
| 5,053,271 A | 10/1991 | Mori et al. |
| 5,284,436 A | 2/1994 | Gellert |
| 5,299,928 A | 4/1994 | Gellert |
| 5,334,008 A | 8/1994 | Gellert |
| 5,421,716 A | 6/1995 | Gellert |
| 5,505,613 A | 4/1996 | Krummenacher |
| 5,545,028 A | 8/1996 | Hume et al. |
| 5,554,395 A | 9/1996 | Hume et al. |
| 5,652,003 A | 7/1997 | Gellert |
| 5,695,793 A | 12/1997 | Bauer |
| 5,700,499 A | 12/1997 | Bauer |
| 5,811,140 A | 9/1998 | Manner |
| 5,834,041 A | 11/1998 | Sekine et al. |

(Continued)

FOREIGN PATENT DOCUMENTS

DE    3245571 A1    6/1984

(Continued)

OTHER PUBLICATIONS

PCT Search Report for PCT/CA03/01154 dated Dec. 3, 2004.

(Continued)

*Primary Examiner*—Tim Heitbink
(74) *Attorney, Agent, or Firm*—Medler Ferro PLLC (57) ABSTRACT

A mold gate insert includes a mold gate insert body, which is comprised of a material having a high thermal conductivity, and a thermal insulation element, which is nested in the mold gate insert body. The thermal insulation element is provided to abut a nozzle seal and align the nozzle with a mold gate. The amount of heat transferred from the nozzle to the mold gate insert is reduced by the thermal insulation element.

23 Claims, 13 Drawing Sheets

U.S. PATENT DOCUMENTS

| | | |
|---|---|---|
| 5,849,343 A | 12/1998 | Gellert et al. |
| 5,871,786 A | 2/1999 | Hume et al. |
| 5,879,727 A | 3/1999 | Puri |
| 5,895,669 A | 4/1999 | Seres, Jr. et al. |
| 6,017,209 A | 1/2000 | Gellert et al. |
| 6,030,202 A | 2/2000 | Gellert et al. |
| 6,050,806 A | 4/2000 | Ko |
| 6,089,468 A | 7/2000 | Bouti |
| 6,220,850 B1 | 4/2001 | Catoen et al. |
| 6,245,278 B1 | 6/2001 | Lausenhammer et al. |
| 6,264,460 B1 | 7/2001 | Wright et al. |
| 6,273,706 B1 | 8/2001 | Gunther |
| 6,309,208 B1 | 10/2001 | Kazmer et al. |
| 6,358,038 B1 | 3/2002 | Rozenberg |
| 6,358,039 B1 | 3/2002 | Manner et al. |
| 6,419,116 B1 | 7/2002 | Eigler et al. |
| 2003/0008034 A1 | 1/2003 | Niewels |
| 2003/0170340 A1 | 9/2003 | Sicilia et al. |

FOREIGN PATENT DOCUMENTS

| | | |
|---|---|---|
| DE | 29602484 U1 | 5/1996 |
| DE | 19608676 C1 | 1/1997 |
| DE | 298 09 855 U1 | 8/1998 |
| DE | 100 37 739 A1 | 2/2002 |
| EP | 0638407 A1 | 2/1995 |
| EP | 0750975 A1 | 1/1997 |
| EP | 0873841 A2 | 10/1998 |
| EP | 0962296 A2 | 12/1999 |
| EP | 1188537 A2 | 3/2002 |
| FR | 2537497 | 6/1984 |
| JP | 05-177664 | 7/1993 |
| JP | 05-261770 | 10/1993 |
| JP | 05-309695 | 11/1993 |
| JP | 7-148786 | 6/1995 |
| JP | 7-186203 | 7/1995 |
| JP | 8-90598 | 4/1996 |
| JP | 10-264222 | 10/1998 |
| JP | 11-254488 | 9/1999 |
| JP | 2002-307492 | 10/2002 |
| JP | 2003-11173 | 1/2003 |
| JP | 2003-11174 | 1/2003 |
| JP | 2003-11176 A | 1/2003 |
| WO | WO 84/00922 | 3/1984 |
| WO | WO 00/48814 | 8/2000 |
| WO | WO 01/78961 A1 | 10/2001 |
| WO | WO 03/004243 | 1/2003 |
| WO | PCT/CA 03/00550 | 7/2003 |
| WO | WO 03/070446 A1 | 8/2003 |
| WO | WO 2004/012923 A2 | 2/2004 |

OTHER PUBLICATIONS

H.P. Manner, "Nadelverschluβdusen fur kurze Zykluszeit," Kunststoffe 85(2): 166-168(1995).

Images and information from "Gunther Hot Runner Technology," taken from Gunther website Aug. 2003.

* cited by examiner

MOLD GATE INSERT WITH A THERMAL BARRIER

This application claims the benefit of U.S. Provisional Application No. 60/371,711, filed on Apr. 12, 2002.

FIELD OF THE INVENTION

The present invention relates generally to an injection molding apparatus, and in particular to mold gate insert for providing a thermal barrier between a mold gate and a nozzle tip.

BACKGROUND OF THE INVENTION

In an injection molding apparatus, a manifold receives a pressurized melt stream of a moldable material from a machine nozzle. The manifold distributes the melt stream to a plurality of hot runner nozzles. Melt is injected from each nozzle through a mold gate and into a mold cavity where the melt is cooled to its "freezing" temperature, and then ejected from the mold cavity. The cycle is repeated so that multiple molded products may be produced.

The number of molded products that are output over a set time period is limited by the cycle time of the injection molding apparatus. The cycle time is determined by several factors, including the physical and chemical attributes of the resin, the size of the molded product, and the time required for the product to cool in the mold before it is ejected.

Reducing the cooling time of the molded product will reduce the overall cycle time. However, undesirable physical defects often result from attempts to reduce the cooling time, particularly in products, such as preforms, made from polyethylene teraphthalate (PET). The most common of these undesirable characteristics are gate defects that occur in that portion of the preform in the vicinity of the gate. These common defects include crystalline halos and plugs, gate voids, internal dimples, scarred gates, and sticky or stringy gates. Many variables affect the quality of the gate area in a finished preform. Processing parameters, such as mold gate timing, nozzle tip temperature, and the flow rate of cooling fluid can all be adjusted to improve preform quality. However, insufficiently rapid heat transfer at the gate area remains one of the most persistent difficulties to overcome, and a continuing obstacle to greatly improved cycle times.

In a hot runner injection molding system with valve gating, the mold gate area is typically not cooled sufficiently. The mold gate is typically a tapered hole that is formed in a gate insert. A valve pin engages the mold gate to close the gate and prevent melt from flowing into the mold cavity. Because the mold gate is located between the high temperature nozzle tip and the mold cavity, heat is often undesirably transferred through the gate insert to the mold cavity. At the same time, the mold cavity quickly cycles between a high temperature when the gate is open to a low temperature sufficient to freeze the resin when the mold has been filled and the gate closed. The valve pin itself also transfers heat to the mold gate when the mold gate is closed. In order to lower the cycle time of the injection molding apparatus, it is desirable to thermally isolate the mold cavity from the nozzle tip.

Several prior art references disclose thermal shielding at the nozzle tip to limit cooling of the hot runner nozzle tip in the vicinity of the mold gate area.

U.S. Pat. No. 6,220,850 discloses a mold gate insert that is formed of two pieces. A first portion of the insert forms a gate land and is made of an insulating material to thermally shield the nozzle. The second portion of the insert forms a section of the mold cavity and is made of a highly thermally conductive material. During the cooling phase of the injection cycle, the second portion provides rapid dissipation of heat to cool the mold cavity, while the first portion creates a thermal barrier to shield the nozzle tip from the cooling of the second portion.

U.S. Pat. No. 5,879,727 discloses a thermal insulating element provided between a nozzle tip and a mold insert. The thermal insulating element limits the heat loss from the nozzle tip to the gate insert.

U.S. Pat. No. 5,554,395 discloses a seal that is provided between a bushing, which delivers a melt stream to a mold cavity, and a mold, which houses the mold cavity. The seal closes off the gap between the bushing and the mold and limits the conduction of heat therebetween.

Some of the disadvantages of prior art tip insulation include insufficient thermal sealing of the nozzle tip in cases where the mold insert form part of the mold cavity. In additional, prior art insulating devices are often complex to manufacture, particularly when more than one material is used.

It is therefore an object of the present invention to provide a mold gate insert having a thermal barrier, which obviates or mitigates the above disadvantages.

SUMMARY OF THE INVENTION

According to an aspect of the present invention there is provided an injection molding apparatus comprising:
  a manifold having a manifold channel for receiving a melt stream of moldable material under pressure;
  a nozzle having a nozzle tip and a nozzle channel, the nozzle channel being in communication with the manifold channel for receiving the melt stream from the manifold channel;
  a seal coupled to the nozzle tip, the seal having an outer surface;
  a mold gate insert surrounding the nozzle tip, the mold gate insert including a mold gate to allow melt to travel from the nozzle channel into a mold cavity;
  a flange extending from an inner surface of the mold gate insert, a surface of the flange being in abutment with an outer surface of the seal;
  a groove provided in the mold gate insert, the groove being located adjacent the flange; and
  wherein the groove decreases the amount of heat that is transferred to the mold gate insert through the flange.

According to another aspect of the present invention there is provided an injection molding apparatus comprising:
  a manifold having a manifold channel for receiving a melt stream of moldable material under pressure;
  a nozzle having a nozzle tip and a nozzle channel, the nozzle channel being in communication with the manifold channel for receiving the melt stream from the manifold channel;
  a seal coupled to the nozzle tip, the seal having an outer surface;
  a mold gate insert surrounding the nozzle tip, the mold gate insert including an inner surface for abutting the outer surface of the seal and a groove that is spaced from the inner surface;
  a mold gate provided in the mold gate insert to allow melt to flow from the nozzle channel into a mold cavity; and
  wherein the groove decreases the amount of heat that is transferred to the mold gate insert through the flange.

According to another aspect of the present invention there is provided an injection molding apparatus comprising:
- a manifold having a manifold channel for receiving a melt stream of moldable material under pressure;
- an injection nozzle having a nozzle body and a nozzle tip, the nozzle tip being surrounded by a nozzle seal, the injection nozzle having a nozzle channel for receiving a melt stream of moldable material from the manifold channel;
- a mold gate insert having a first portion and a second portion, the second portion being nested in the first portion and spaced from a mold gate to align the nozzle seal within the mold gate insert, the second portion being comprised of a thermally insulating material;
- a mold gate provided in the mold gate insert to allow melt to flow from the nozzle channel into a mold cavity; and
- wherein the second portion provides insulation between the first portion of the mold gate and the nozzle seal.

According to yet another aspect of the present invention there is provided a mold gate insert comprising:
- a mold gate insert body comprised of a material having a high thermal conductivity;
- a mold gate provided in the mold gate insert body for allowing a melt stream to flow into a mold cavity; and
- a thermal insulation element nested in the mold gate insert body, the thermal insulation element for abutting a nozzle seal of a nozzle to align the nozzle with the mold gate.

According to another aspect of the present invention there is provided an injection molding apparatus comprising:
- a manifold having a manifold channel for receiving a melt stream of moldable material under pressure;
- an injection nozzle having a nozzle body and a nozzle tip, the nozzle tip being surrounded by a nozzle seal, the injection nozzle having a nozzle channel for receiving a melt stream of moldable material from the manifold channel;
- a mold gate insert having a thermal insulation element nested in a mold gate insert body, the mold gate insert having a nozzle seal alignment surface for abutting an outer surface of the nozzle seal;
- a mold gate provided in the mold gate insert to allow melt to flow from the nozzle channel into a mold cavity;
- wherein the thermal insulation element provides insulation between the mold gate insert body and the nozzle seal.

The present invention provides an advantage in that the thermal insulation element reduces the amount of heat transferred from the nozzle to the mold gate insert. The present invention provides a further advantage in that the seal is aligned within the mold gate insert.

BRIEF DESCRIPTION OF THE DRAWINGS

Embodiments of the present invention will now be described more fully with reference to the accompanying drawings in which:

FIGS. 13(i) and (ii) are both side sectional views of a nozzle with a mold gate insert of the present invention.

DETAILED DESCRIPTION OF THE PREFERRED EMBODIMENTS

Figure 1:
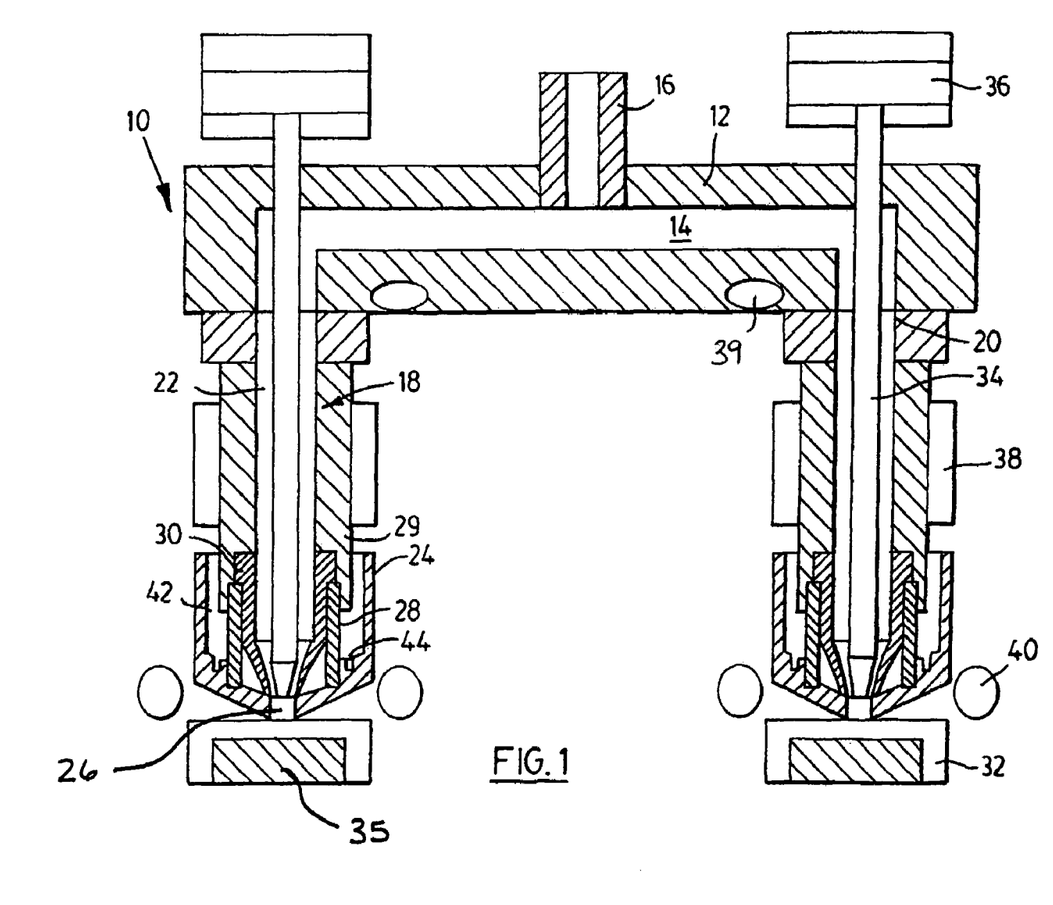
FIG. 1 is a side sectional view of an injection molding apparatus of the present invention.
Figure 2:
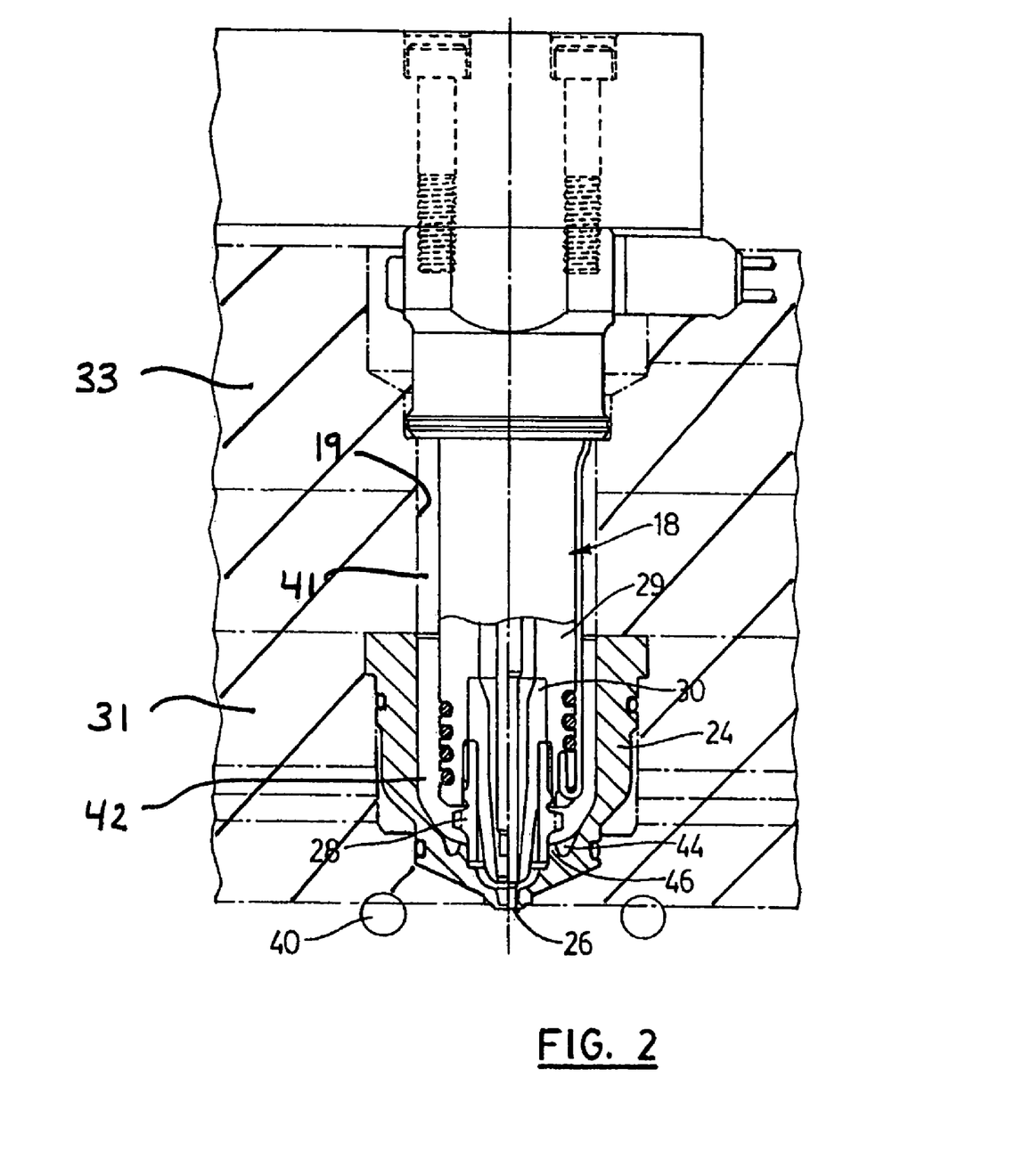
FIG. 2 is a side sectional view of portions of an injection molding apparatus of the present invention.

Referring to FIGS. 1 and 2, portions of a hot runner injection molding apparatus are generally shown at 10. The injection molding apparatus 10 comprises a manifold 12 having a manifold melt channel 14 for receiving a melt stream of moldable material under pressure from a manifold bushing 16. Manifold 12 is positioned between a back plate (not shown) and a mold plate 33, such that manifold bushing 16 extends through the back plate and is in communication with a machine nozzle of an injection molding machine (not shown). Nozzle bores 19 are formed within mold plate 33 and a mold cavity plate 31 for receiving a respective hot runner nozzle 18.

Nozzles 18 are coupled to respective outlets 20 of the manifold 12 and are positioned within nozzle bores 19 such that an insulative air space 41 is provided between nozzles 18 and nozzle bore 19. A nozzle channel 22 extends through each nozzle 18 for receiving the melt stream of moldable material from the manifold 12. Each nozzle 18 includes a nozzle body 29 and a nozzle tip 30. Manifold heaters 39 and nozzle heaters 38 heat the manifold 12 and nozzles 18 respectively in order to maintain the melt stream at a high temperature. A mold gate 26 is provided in a mold gate insert 24, which generally surrounds the tip 30 of each nozzle 18. The mold gates 26 are openable to allow delivery of the melt stream to respective mold cavities 32 that are respectively formed between mold cavity plate 31 and movable mold cores 35. A valve pin 34 extends through the length of each nozzle 18 and is movable by a valve piston 36 to open and close the mold gate 26.

Cooling channels 40 are provided within mold cavity plate 31 adjacent the mold gate inserts 24 and the mold cavities 32 in order to facilitate cooling of the melt in the mold cavities 32. The mold gate insert 24 is typically comprised of a highly thermally conductive material such as copper, for example. The high thermal conductivity of the mold gate insert 24 allows the mold gate 26 to be cooled rapidly so as to freeze the melt in the mold gate area. This minimizes the occurrence of drooling from the nozzle 18. An insulation chamber 42 between mold gate insert 24 and nozzle 18 minimizes the heat transfer between the mold gate insert 24 and the nozzle 18. The insulation chamber 42 is typically filled with air.

A seal 28 is provided between the nozzle 18 and mold gate insert 24. The seal 28 is comprised of a thermally insulating material, such as steel or titanium, for example. The seal 28 restricts the back flow of melt so that the melt does not enter the insulation chamber 42. In addition, the seal 28 acts to minimize the heat transfer between the mold gate insert 24 and the nozzle tip 30.

Figure 3:
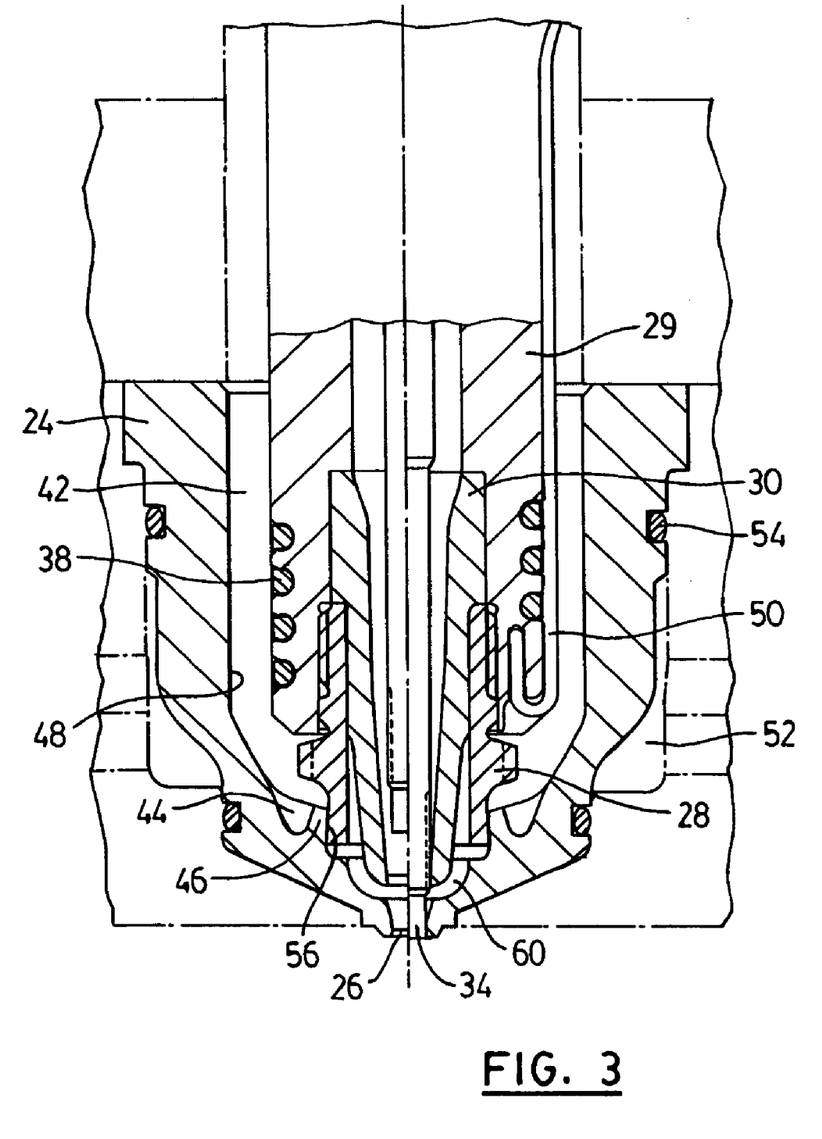
FIG. 3 is an enlarged view of portions of FIG. 2.

As shown in FIGS. 2 and 3, the lower end of the seal 28 abuts a mating surface 56 of a flange 46, which projects from an inner wall 48 of the mold gate insert 24. The flange 46 locates the seal 28 in the mold gate insert 24 so that the nozzle 18 is properly aligned with the mold gate 26. A bubble area 60 is located between the seal 28, mold gate 26 and the nozzle tip 30. The bubble 60 is filled with melt, which becomes solid when the mold gate 26 is frozen. A water cooling cavity 52 surrounds the mold gate insert 24 to facilitate freezing thereof. Seals 54 are employed to prevent water from escaping from the cavity 52. The nozzle assembly of FIGS. 2 and 3 further includes a thermocouple 50.

Figure 4:
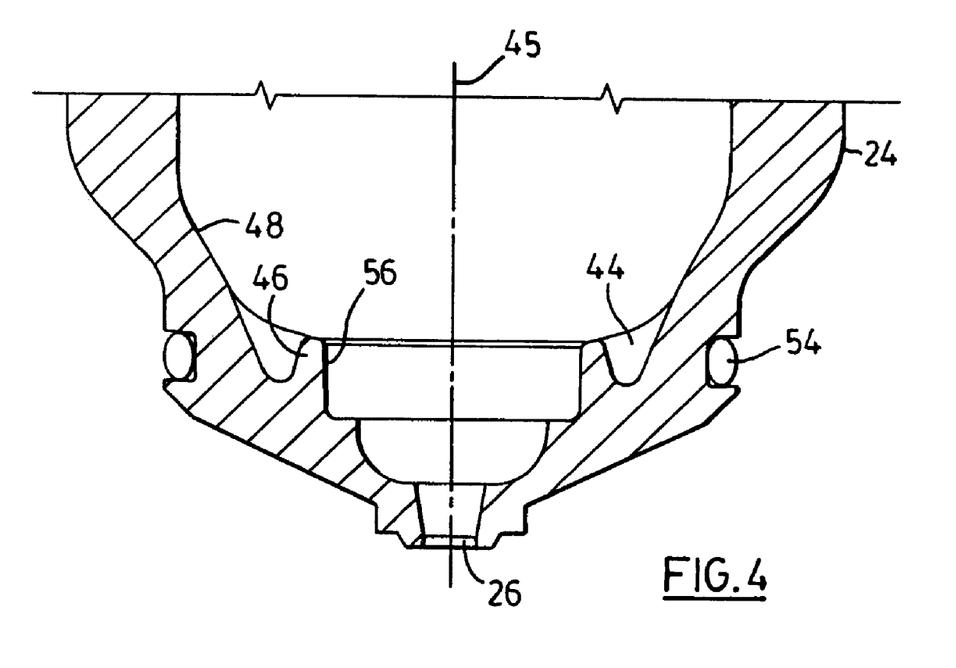
FIG. 4 is a side sectional view of a mold gate insert of the present invention.

FIG. 4 is an enlarged view of the mold gate insert 24. A groove 44 is formed in the inner wall 48 of the mold gate insert 24 and is located adjacent the flange 46. The groove 44 is continuous and generally concentric with an axis 45 of the mold gate 24. The groove 44 extends the insulation chamber 42 so the thickness of the mold gate 24 between the inner wall 48 of the insulation chamber 42 and the outer wall of the mold gate insert 24 is reduced.

It will be appreciated that the groove 44 may be offset from the axis of the mold gate 26 and in addition, the groove 44 is not restricted to following a circular path. In an alternative embodiment, the groove 44 comprises a series of segments that are spaced in a generally circular path in the inner wall 48 of the mold gate insert 24. In a further alternative embodiment, the groove 44 comprises a series of holes that are spaced along a path in the inner wall 48. In a still further alternative embodiment, the path of the groove 44 zig zags. During the cooling stage of the injection molding cycle, water flows through cavity 52 to cool the mold gate insert 24 and the cooling channels 40 cool the mold cavity 32. The mold gate 26 and the melt located in the bubble area 60 freezes.

To reduce cycle time, it is desirable to freeze and subsequently heat the melt in the mold gate 26 as quickly as possible. The insulation chamber 42 reduces the heat transfer between the mold gate insert 24, which is cooled, and the nozzle 18, which is heated. The groove 44 reduces the amount of heat that is transferred directly from the seal 28, which is in contact with the nozzle 18, to the mold gate insert 24. The flange 46 acts as a heat transfer fin providing increased surface area to dissipate the heat more efficiently.

Figure 5:
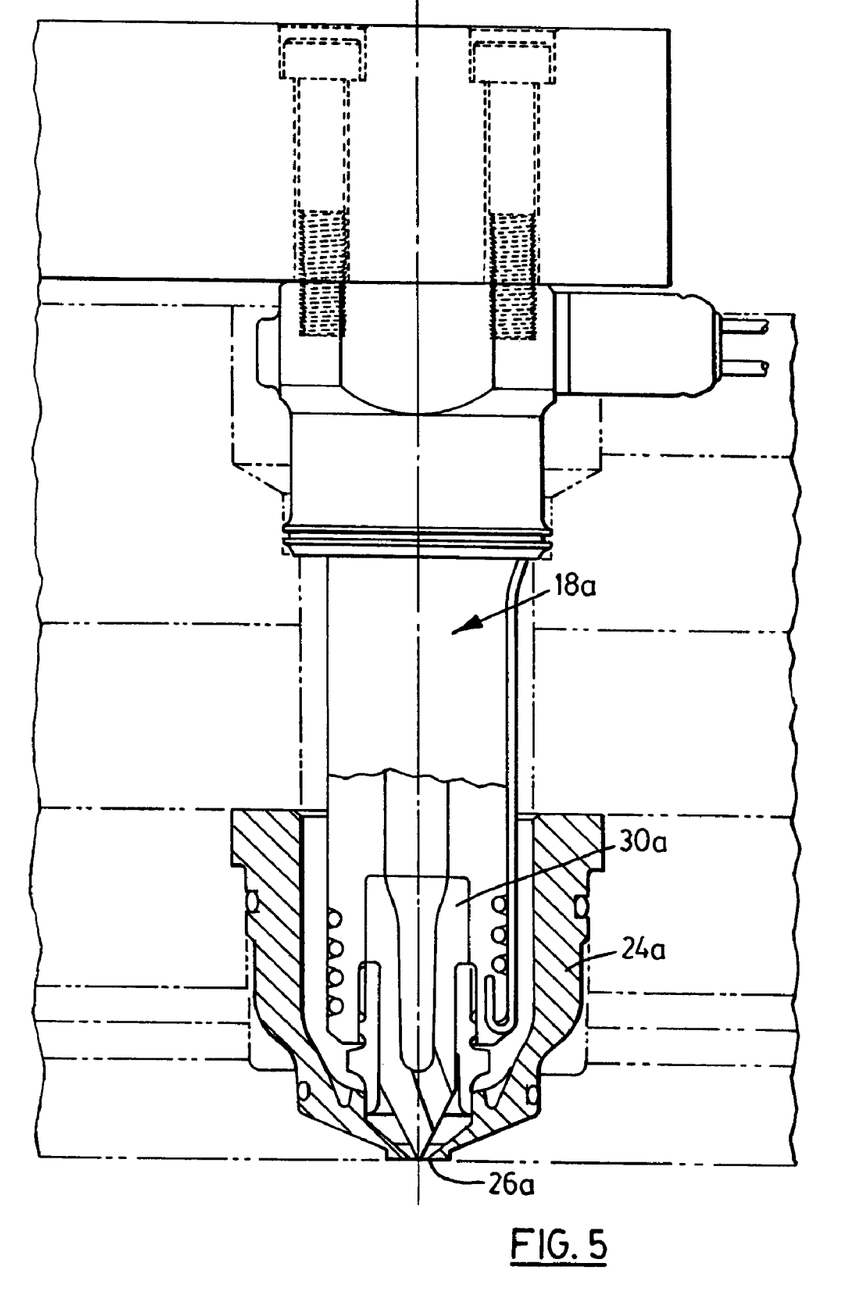
FIG. 5 is a side sectional view of a further embodiment of an injection molding apparatus of the present invention.
Figure 6:
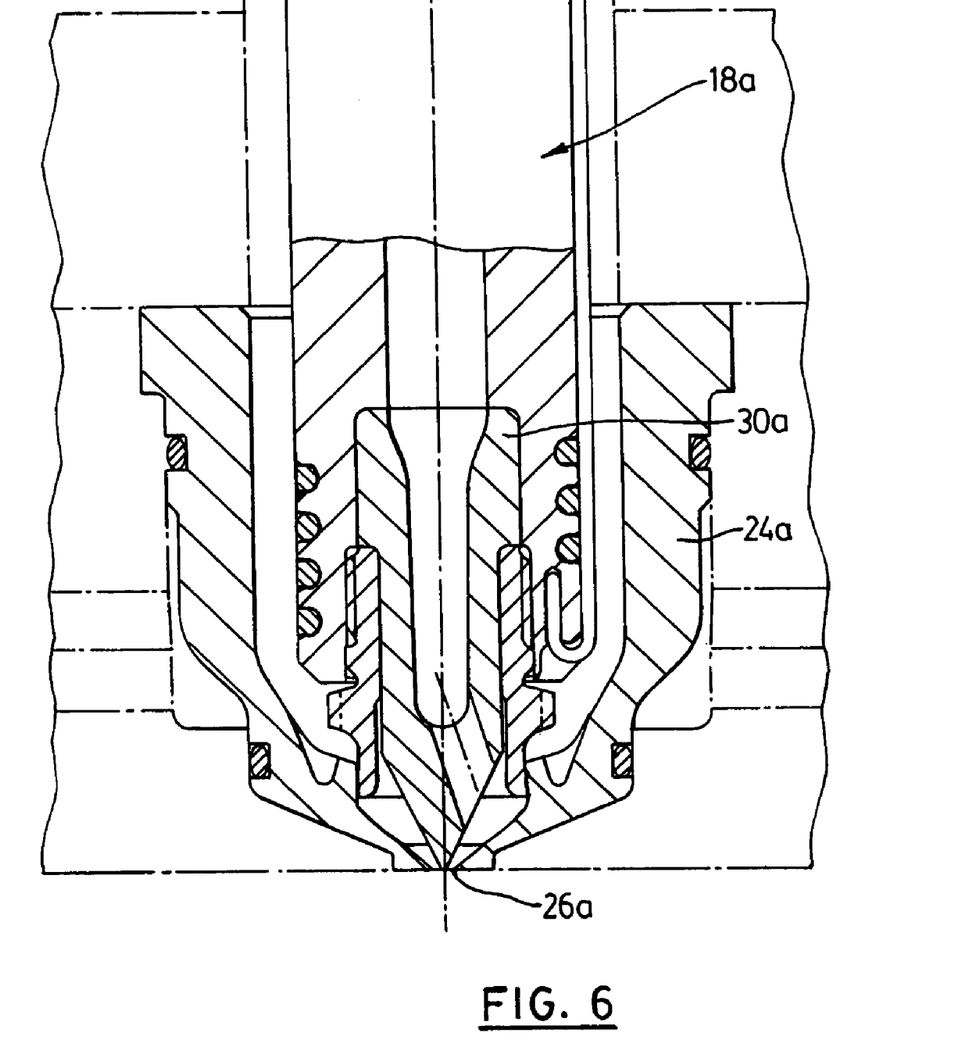
FIG. 6 is an enlarged view of portions of FIG. 5.

Referring to FIGS. 5 and 6, a further embodiment of the present invention is shown. A nozzle 18a is a torpedo-type hot runner nozzle, which uses a thermal gating mechanism. A nozzle tip 30a of the nozzle 18a extends into a mold gate 26a of a mold gate insert 24a. Once the mold cavity (not shown) has been filled with melt, the melt in the mold gate 26a is frozen in order to block the mold gate 26a and thus prevent drooling from the nozzle 18a. The mold gate insert 24a has been previously described in relation to FIGS. 2, 3 and 4 and provides the same thermal insulating advantages as has been previously described.

Figure 7:
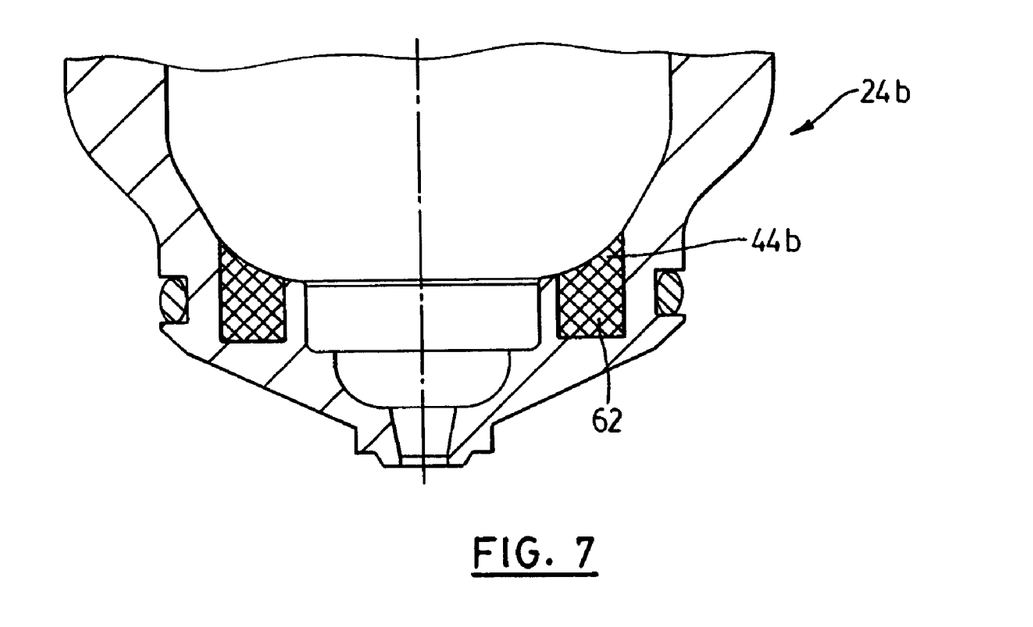
FIG. 7 is a further embodiment of a mold gate insert of the present invention.

Referring to FIG. 7, a further embodiment of a mold gate insert 24b is shown. In this embodiment, a groove 44b has a generally rectangular profile and is filled with an insulating material 62 such as a ceramic paste, for example. As shown, the groove 44b is slightly larger than the groove 44 of the previous figures.

It will be appreciated by a person skilled in the art that a larger groove will provide increased insulation capability, however, the size of the groove is limited by the structural requirements of the mold gate insert 24.

Figure 8:
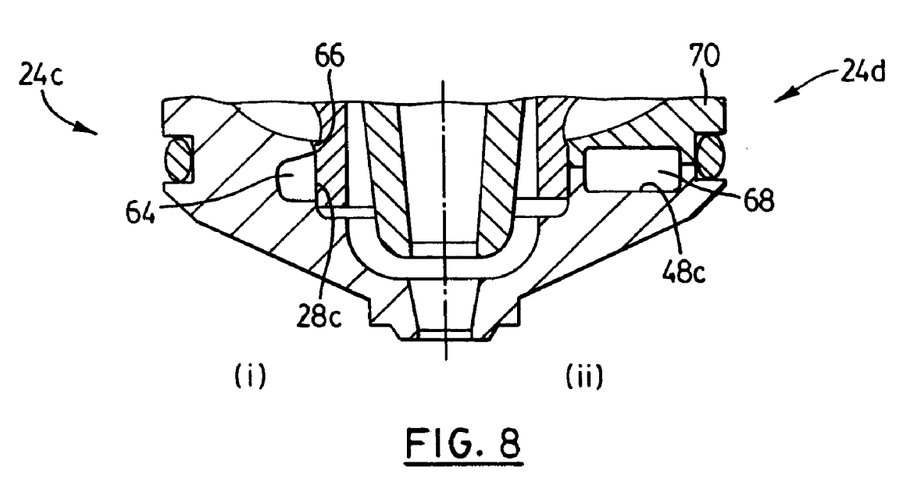
FIG. 8 is a side sectional view of two further embodiments of a mold gate insert of the present invention.

Further embodiments of a mold gate insert 24c and 24d are shown in FIG. 8. Embodiment (i) includes a pocket 64 that has an open side 66. The seal 28c abuts the open side 66 of the pocket 64 to seal air inside. Alternatively, there may not be a complete seal formed between open side 66 and seal 28 so that melt may leak into the pocket 64. The melt would also act as an insulator.

Embodiment (ii) of FIG. 8 includes a pocket 68 that is provided between an inner wall 48c of the mold gate insert 24d and a second insert portion 70. The pocket 68 may be filled with air or, alternatively, a ceramic insulating material. The second insert portion 70 may be comprised of the same thermally conductive material as the mold gate insert 24d or it may also be different. The second insert portion 70 may alternatively be made of a less thermally conductive material.

Figure 9:
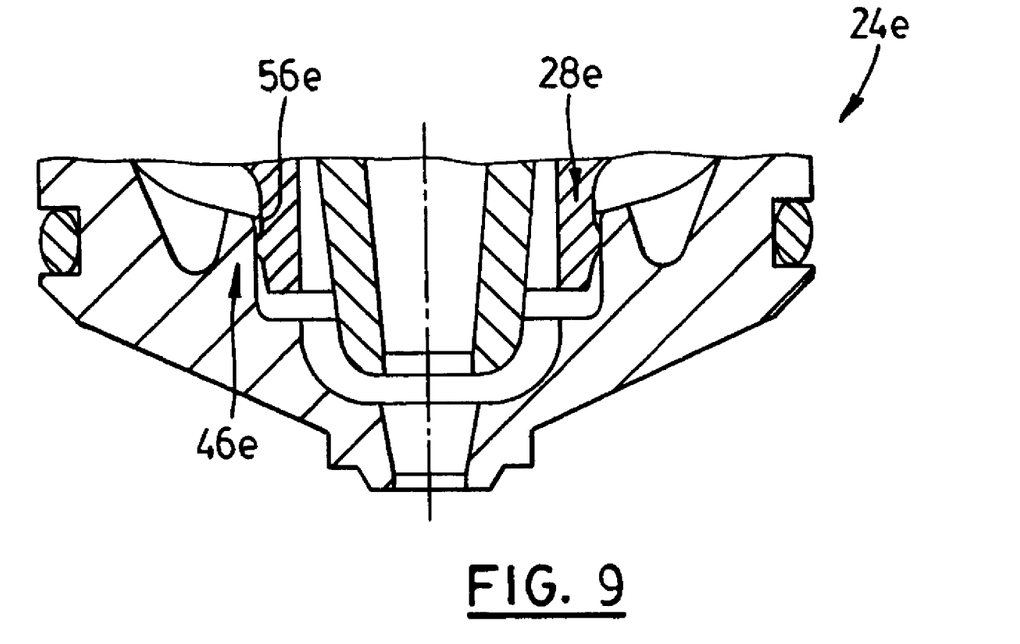
FIG. 9 is a side sectional view of a further embodiment of a mold gate insert of the present invention.

Referring to FIG. 9, still a further embodiment of a mold gate insert 24e is shown. In this embodiment, seal 28e abuts a smaller portion of mating surface 56e of flange 46e so that melt may fill the space provided between the seal 28e and the mating surface 56e and act as an insulator.

Figure 10:
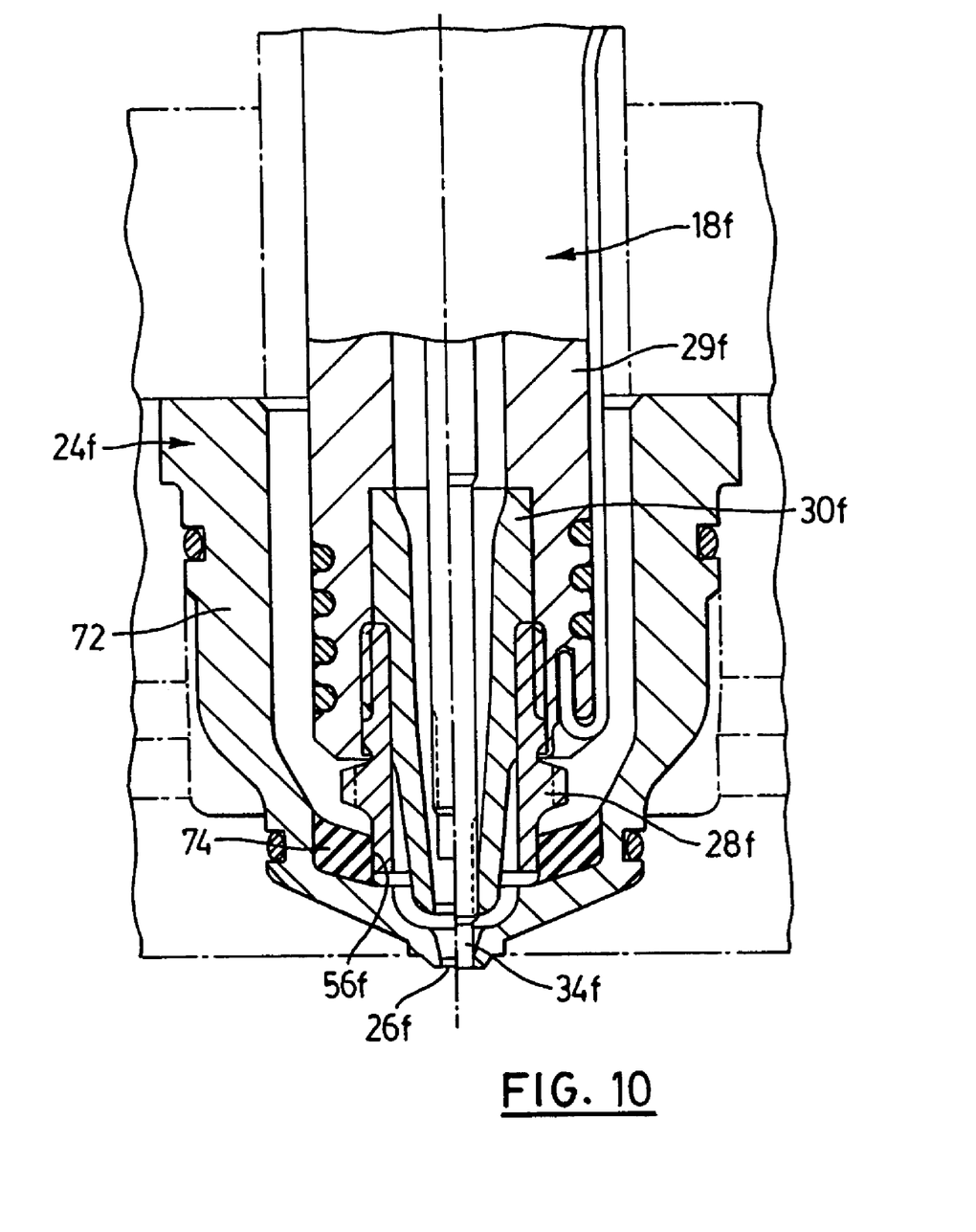
FIG. 10 is a side sectional view of yet a further embodiment of a mold gate insert of the present invention.

A further embodiment of a mold gate insert 24f is shown in FIG. 10. A nozzle 18f, which includes a nozzle body 29f and a nozzle tip 30f, extends through the mold gate insert 24f to deliver melt through a mold gate 26f and into a mold cavity (not shown). The mold gate 26f is selectively openable by a valve pin 34f that extends through the nozzle 18f. A seal 28f is provided between the nozzle tip 30f and the mold gate insert 24f. Other components of the injection molding apparatus are similar to those described in relation to FIGS. 1–3.

Figure 11:
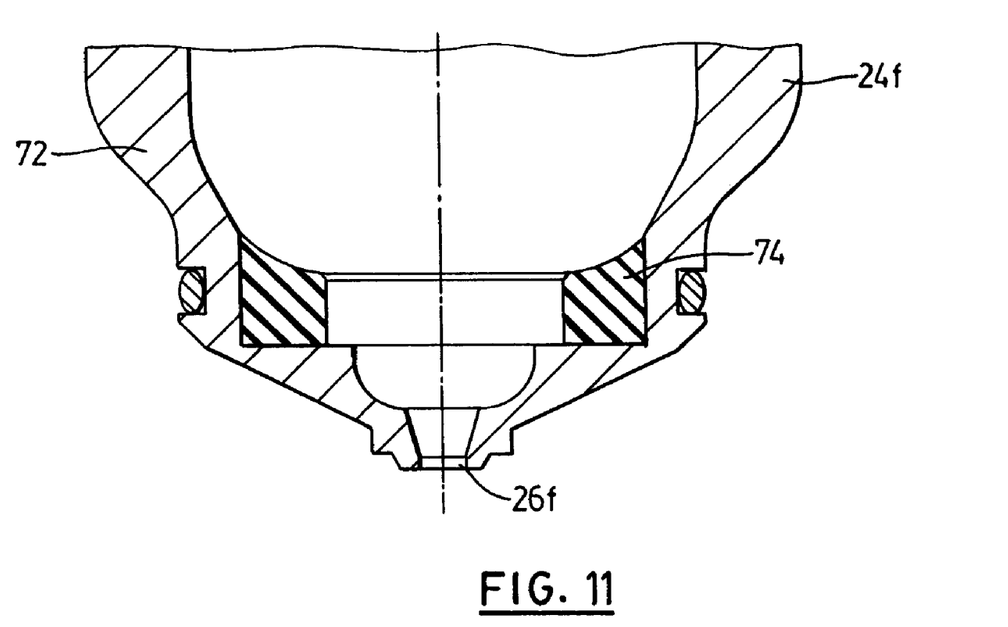
FIG. 11 is an enlarged view of the mold gate insert of FIG. 10.

The mold gate insert 24f, which is shown in FIG. 11, includes a thermal insulation element 74 that is nested within a mold gate insert body 72. The thermal insulation element 74 includes an inner wall 56f that abuts the seal 28f. The thermal insulation element 74 is comprised of an insulating material, which has a lower thermal conductivity than the material of mold gate insert body 72. The thermal insulation element 74 may be comprised of materials such as high temperature polymers such as high performance polyimide (such as VESPEL), PEEK, or titanium, for example. The inner wall 56f of the thermal insulation element 74 aligns the seal 28f within the mold gate insert 24f. This allows the nozzle 18f to be aligned with the mold gate 26f so that the valve pin 34f may operate efficiently. The thermal insulation element 74 further serves to insulate the mold gate insert 24f from the nozzle 18f.

Figure 12:
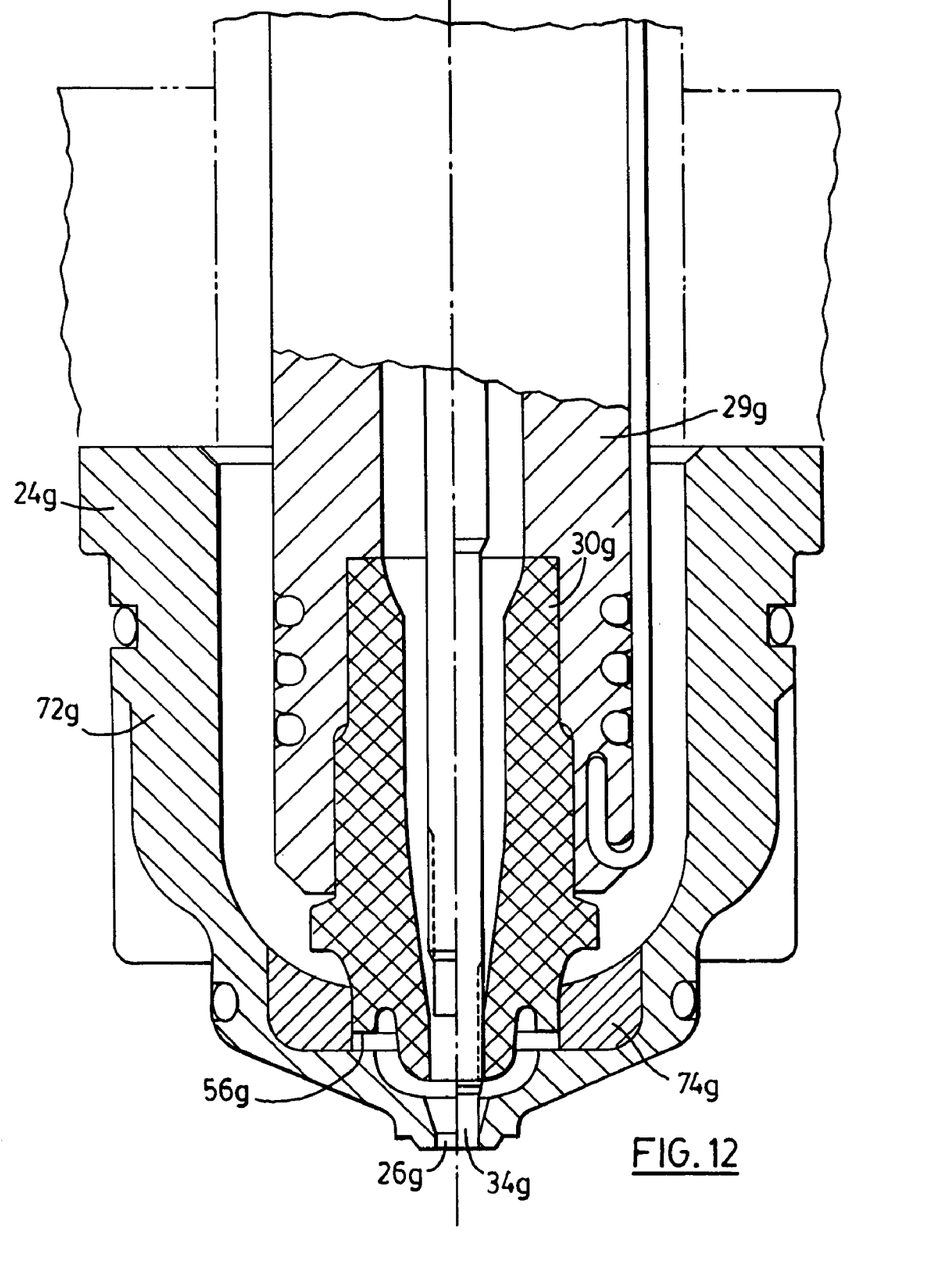
FIG. 12 is side sectional view of still a further embodiment of a mold gate insert of the present invention.

Referring now to FIG. 12, a nozzle 18g includes a nozzle body 29g, a nozzle tip 30g and a valve pin 34g, which extends through the nozzle 18g. The seal 28, which has been shown in the previous figures, has been integrated into the nozzle tip 30g. A mold gate insert 24g includes a mold gate 26g, which is aligned with the nozzle 18g to allow melt to pass therethrough into a mold cavity (not shown). The mold gate insert 24g is similar to the mold gate insert 24f of FIGS. 10 and 11 and includes a mold gate insert body 72g and a thermal insulation element 74g. An inner wall 56g of the mold gate insert 24g abuts the nozzle tip 30g to provide a seal therebetween.

Figure 13:
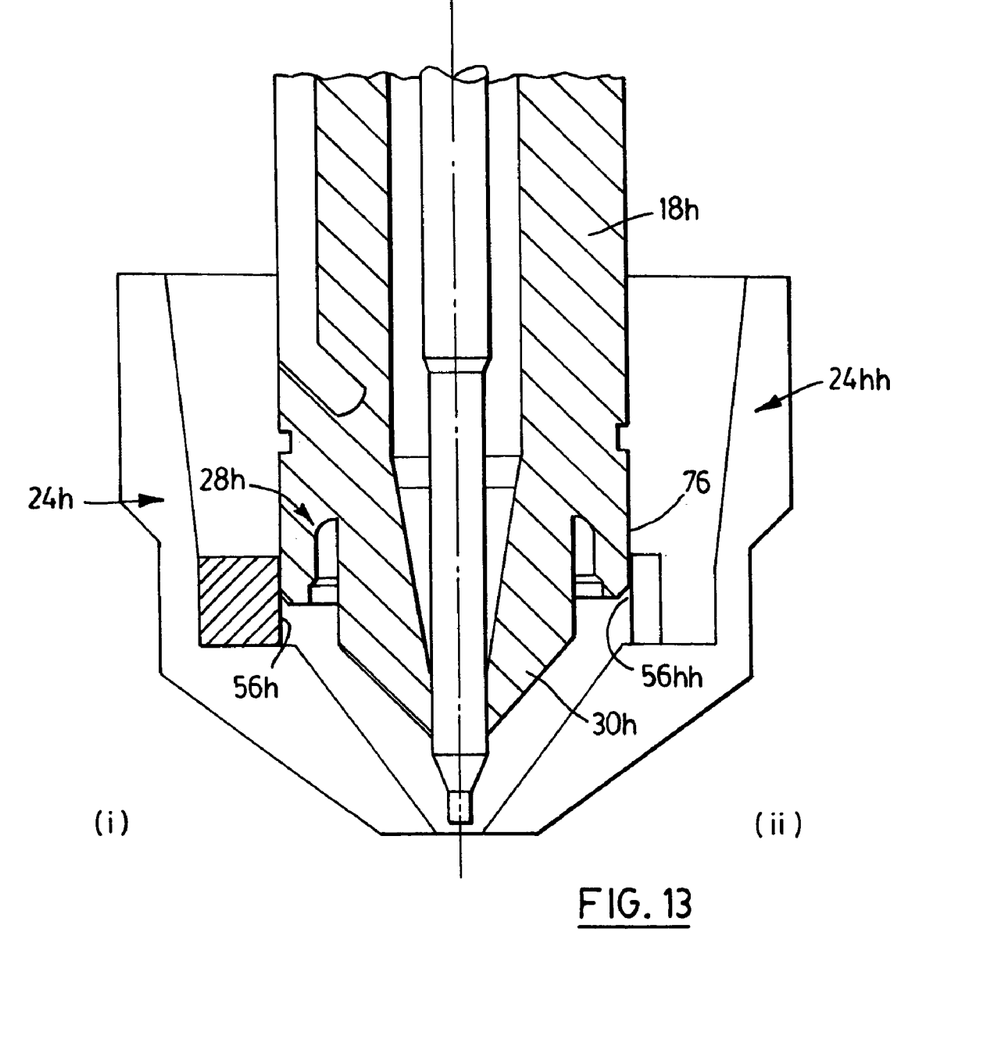

It will be appreciated by a person skilled in the art that the mold gate inserts described herein may be used with any nozzle having a nozzle seal surrounding a tip thereof. FIG. 13 is divided into (i) and (ii) to show two different mold gate inserts surrounding a nozzle 18*h*. FIG. 13 (i) shows the nozzle 18*h* surrounded by a mold gate insert 24*h* that is similar to the mold gate insert 24*f* of FIGS. 10 and 11. FIG. 13(ii) shows the nozzle 18*h* surrounded by a mold gate insert 24*hh*, which is similar to the mold gate insert 24 shown in FIGS. 2–6.

The nozzle 18*h* includes an integral nozzle tip 30*h* and nozzle seal 28*h*. When assembled in an injection molding apparatus, an outer surface 76 of the nozzle 18*h* abuts the inner wall 56*h*, 56*hh* of the mold gate inserts 24*h* and 24*hh*, respectively, to provide a seal therebetween. It will be appreciated by a person skilled in the art that the nozzle 18*h* may be used with any of the mold gate insert embodiments that have been previously described.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold having a manifold channel for receiving a melt stream of moldable material under pressure;
   a nozzle having a nozzle tip and a nozzle channel, the nozzle channel is in communication with the manifold channel for receiving the melt stream from the manifold channel, wherein the nozzle is positioned within a nozzle bore of a mold plate such that an insulation air space surrounds the nozzle;
   a seal coupled to the nozzle, the seal having an outer surface; and
   a mold gate insert surrounding the nozzle tip, the mold gate insert including
      a mold gate to allow melt to flow from the nozzle channel into a mold cavity,
      a flange extending from an inner surface of the mold gate insert, a surface of the flange being in abutment with the outer surface of the seal, and
      a groove provided in the mold gate insert, the groove being located adjacent the flange, wherein the groove provides a thermally insulative barrier between the nozzle tip and a remainder of the mold gate insert by decreasing the amount of heat that is transferred through the flange of the mold gate insert.

2. The injection molding apparatus of claim 1, wherein the nozzle tip and the seal are integral with the nozzle.

3. The injection molding apparatus of claim 1, wherein an insulating material is located in the groove.

4. The injection molding apparatus of claim 1, wherein the insulating material is selected from the group consisting of: high performance polyimide, ceramic, PEEK and titanium.

5. The injection molding apparatus of claim 1, wherein the groove is continuous and concentric with an axis of the mold gate.

6. The injection molding apparatus of claim 1, wherein the groove comprises a series of segments that are spaced in a circular path.

7. The injection molding apparatus of claim 1, wherein the groove comprises a series of segments that are spaced in a path which zig zags.

8. The injection molding apparatus of claim 1, wherein the groove has a generally rectangular profile.

9. The injection molding apparatus of claim 1, wherein the groove is offset from an axis of the mold gate.

10. The injection molding apparatus of claim 1, wherein the groove is radially spaced from the seal.

11. The injection molding apparatus of claim 1, wherein the mold gate insert includes an insulation chamber surrounding the nozzle tip that extends into the groove.

12. The injection molding apparatus of claim 11, wherein the insulation chamber of the mold gate insert continues from the insulative air space surrounding the nozzle.

13. An injection molding apparatus comprising:
   a manifold having a manifold channel for receiving a melt stream of moldable material under pressure;
   a nozzle having a nozzle tip and a nozzle channel, the nozzle channel being in communication with the manifold channel for receiving the melt stream from the manifold channel;
   a seal coupled to the nozzle, the seal having an outer surface, at least a portion of the outer surface of said seal contacting an inner surface of said nozzle; and
   a mold gate insert surrounding the nozzle tip, the mold gate insert including
      a mold gate provided in the mold gate insert to allow melt to flow from the nozzle channel into a mold cavity,
      an inner surface for abutting at least a portion of the outer surface of the seal, and
      a pocket provided in the mold gate insert, wherein the pocket provides a thermally insulative barrier between the nozzle tip and a remainder of the mold gate insert by decreasing the amount of heat that is transferred through the seal.

14. The injection molding apparatus of claim 13, wherein an insulating material is located in the pocket.

15. The injection molding apparatus of claim 14, wherein the insulating material is selected from the group consisting of: high performance polyimide, ceramic, PEEK and titanium.

16. The mold gate insert of claim 14, wherein the insulating material is comprised of a different material than the melt stream.

17. The injection molding apparatus of claim 13, wherein the pocket is substantially closed by the seal.

18. The injection molding apparatus of claim 13, wherein the pocket is radially spaced from the seal.

19. An injection molding apparatus comprising:
   a manifold having a manifold channel for receiving a melt stream of moldable material under pressure;
   an injection nozzle having a nozzle body and a nozzle tip, the nozzle tip being surrounded by a nozzle seal, the nozzle seal including an outer surface with at least a portion of the outer surface contacting an inner surface of the nozzle body, the injection nozzle having a nozzle channel for receiving a melt stream of moldable material from the manifold channel;
   a mold gate insert having a thermal insulation element nested in a mold gate insert body, wherein the mold gate insert has a nozzle seal alignment surface for abutting the outer surface of the nozzle seal and the thermal insulation element is located between the mold gate insert body and the nozzle seal to provide insulation between the mold gate insert body and the nozzle seal; and a mold gate provided in the mold gate insert to allow melt to flow from the nozzle channel into a mold cavity.

20. The injection molding apparatus of claim 19, wherein the thermal insulation element is a sleeve and an inner surface of the sleeve is the nozzle alignment surface.

21. The injection molding apparatus of claim 19, wherein a material of the thermal insulation element is selected from the group consisting of: high performance polyimide, ceramic, PEEK and titanium.

22. The injection molding apparatus of claim 19, wherein the thermal insulation element is a groove and the groove is radially spaced from the nozzle seal.

23. The injection molding apparatus of claim 19, wherein the thermal insulation element is a groove and an inner surface of the groove is the nozzle alignment surface.

* * * * *